R. S. FEND.
AUTOMOBILE.
APPLICATION FILED JAN. 26, 1914.
1,337,007.
Patented Apr. 13, 1920.
3 SHEETS—SHEET 1.
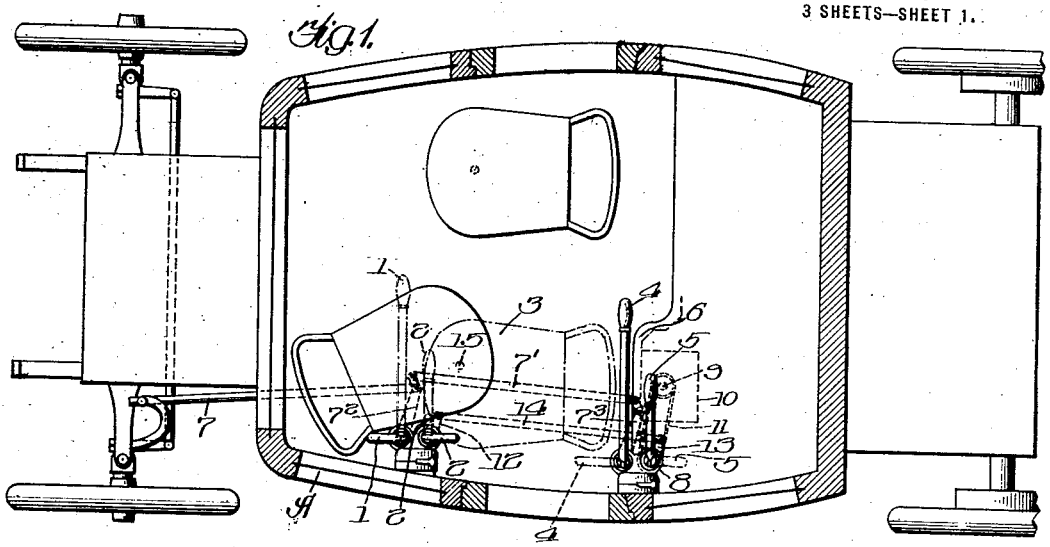
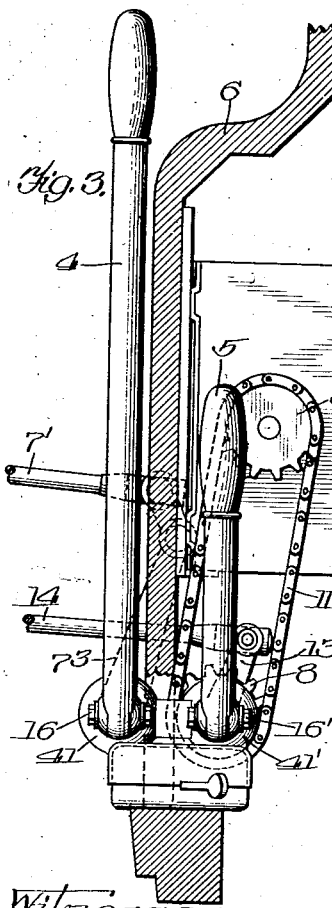
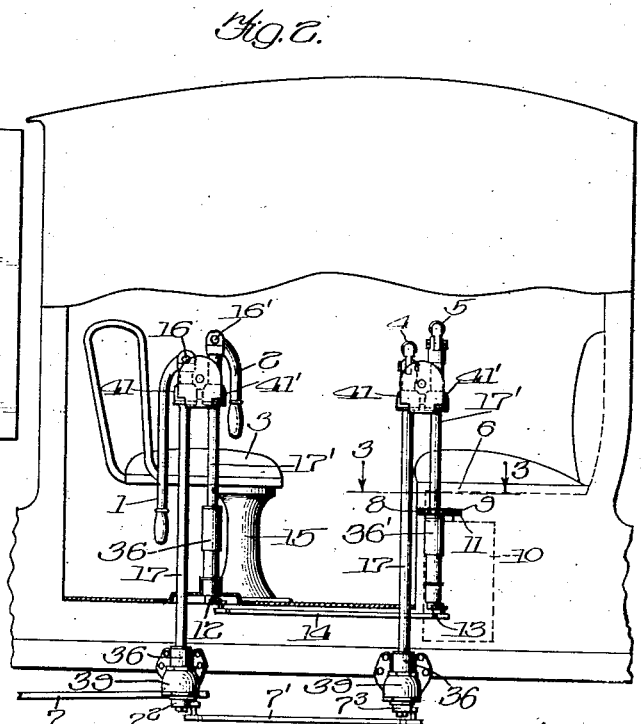
Witnesses:
Inventor:
Roland S. Fend.
By G. L. Gragg
Atty.

R. S. FEND.
AUTOMOBILE.
APPLICATION FILED JAN. 26, 1914.
1,337,007.
Patented Apr. 13, 1920.
3 SHEETS—SHEET 2.
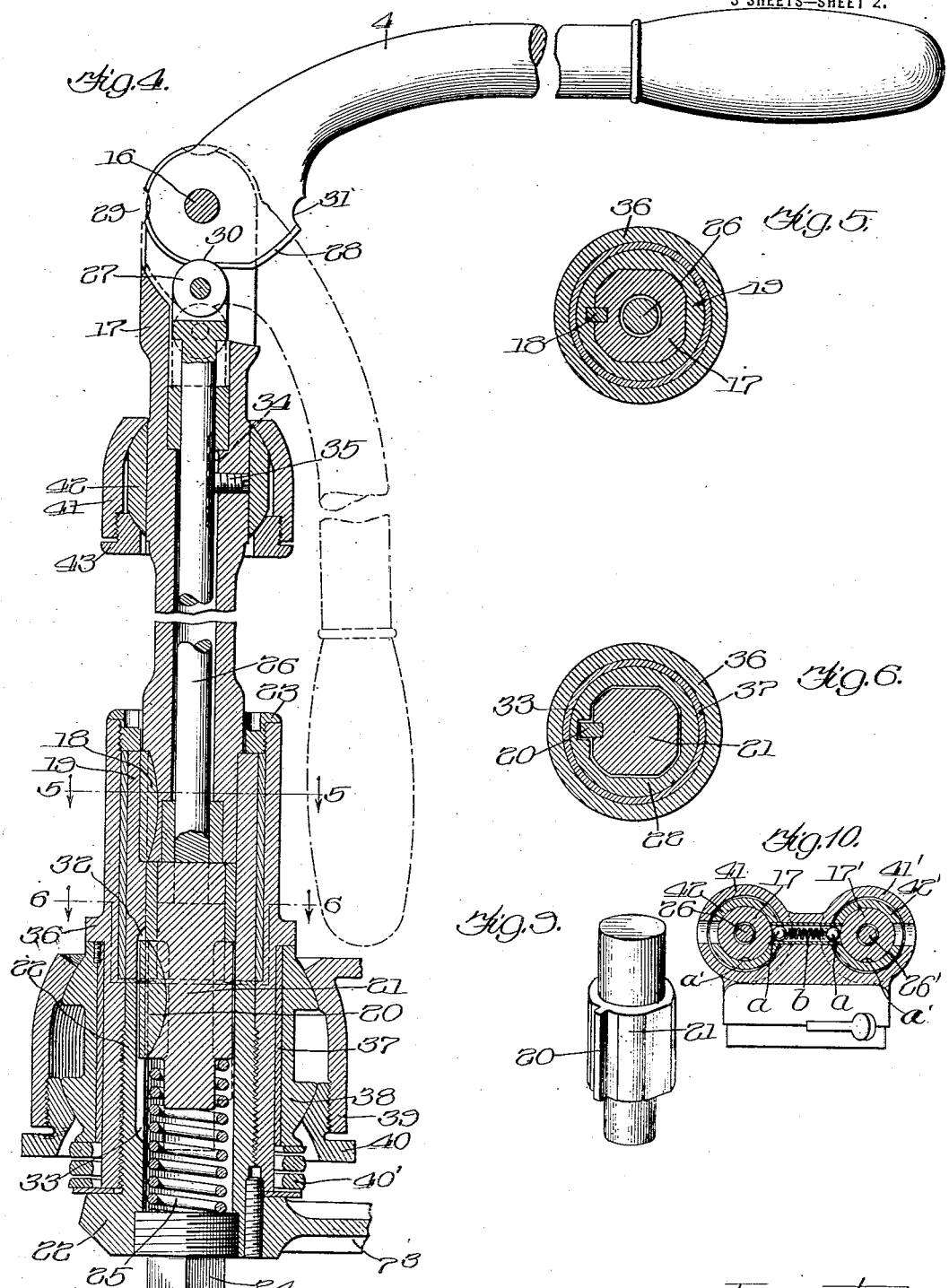
Inventor:
Roland S. Fend.

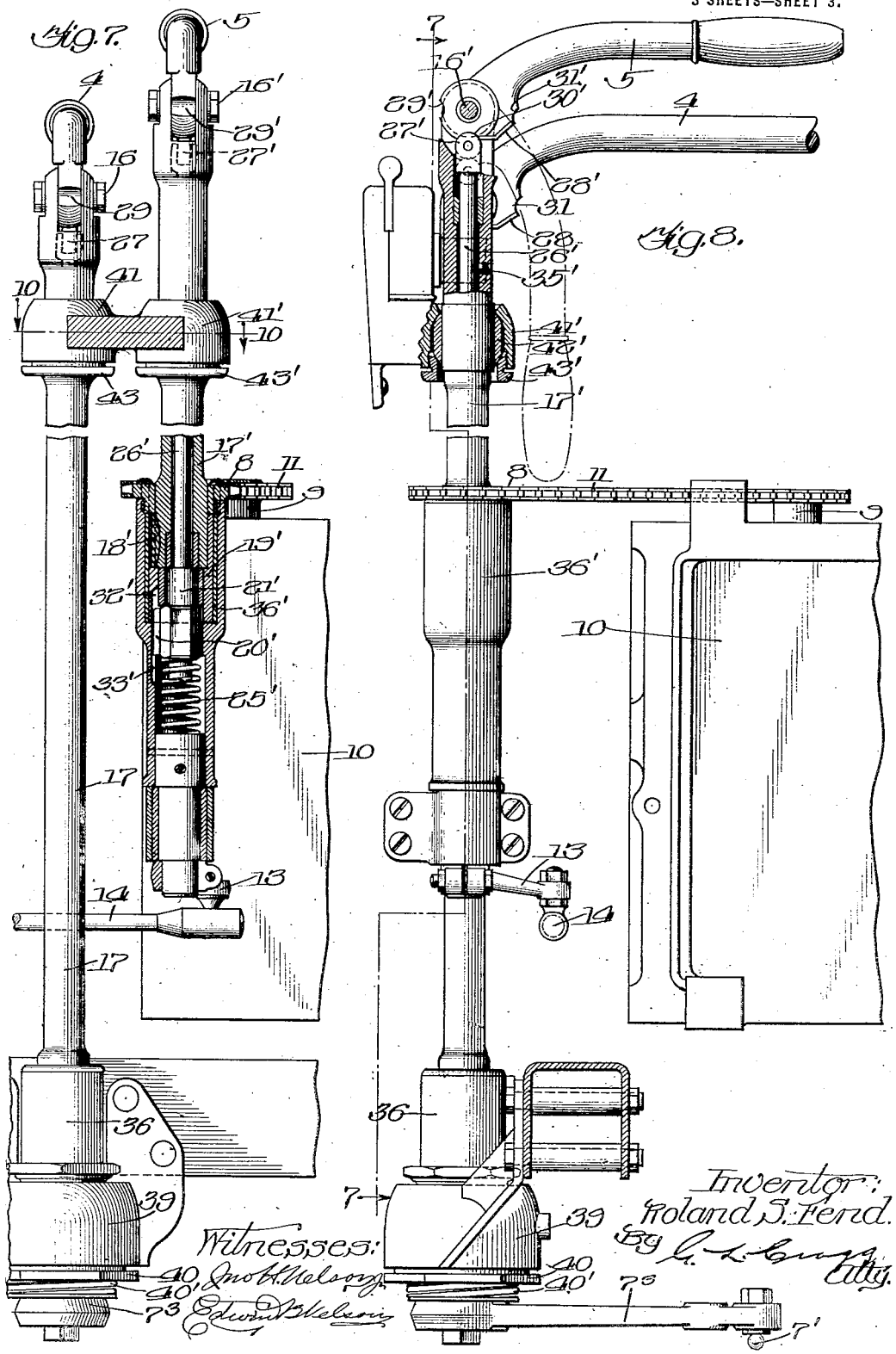

UNITED STATES PATENT OFFICE.

ROLAND S. FEND, OF CHICAGO, ILLINOIS, ASSIGNOR TO THE BAKER R. & L. COMPANY, OF CLEVELAND, OHIO, A CORPORATION OF OHIO.

AUTOMOBILE.

1,337,007.  Specification of Letters Patent.  Patented Apr. 13, 1920.

Application filed January 26, 1914. Serial No. 814,311.

*To all whom it may concern:*

Be it known that I, ROLAND S. FEND, a citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

My invention relates to motor driven vehicles and has for one of its objects the provision of an improved steering mechanism, for another of its objects the provision of an improved controlling mechanism, and for a third object the provision of improved means for enabling the automobile to be controlled by mechanism associated with front and rear seats, the equipment of my invention permitting control of the automobile from either seat while its control from the other seat is prevented.

In practising my invention I employ mechanism for the steering control and the motor control which may have many features in common. By means of the invention the handles at each seat need not be removed but may be maintained in permanent association with the seats to which they are individual, there being, however, means whereby but one set of these handles may be operated at a time so that the control of the automobile may be exercised from one seat only.

I will explain my invention more fully by reference to the accompanying drawings showing the preferred embodiment thereof and in which Figure 1 is a plan view, partially in section, of a part of an automobile constructed in accordance with the invention; Fig. 2 is a view in side elevation, partially in section, of a part of such automobile; Fig. 3 is a plan view, partially in section, on line 3 3 of Fig. 2; Fig. 4 is an elevation, mainly in section, the operating position of the steering lever handle being indicated in full lines and a nonoperating position of such handle in dot and dash lines; Fig. 5 is a sectional view on line 5 5 of Fig. 4; Fig. 6 is a sectional view on line 6 6 of Fig. 4, the operating position of the steering handle and a part of the vehicle body being indicated in dot and dash lines in Figs. 5 and 6; Fig. 7 is a view in elevation, taken partially in section; Fig. 8 is an elevation of the controlling mechanism shown at the rear in Fig. 1, the view being taken in a forward direction; Fig. 9 is a perspective view of a plunger element entering into the construction and Fig. 10 is a sectional view on line 10 10 of Fig. 7.

Like parts are indicated by similar characters of reference through the different figures.

The equipment of my invention is adapted for use in an automobile which is to be governed from either a forward or a rear seat thereof, to which end a steering lever 1 and a motor controlling lever 2 are individual to a forward seat 3 and may be operated by a driver occupying this seat when it is in the position indicated by dot and dash lines in Fig. 1. A second steering lever 4 and a second motor controlling lever 5 are individual to the rear seat 6 and may be operated by a driver occupying this seat. Both steering handles 1, 4 are common to the steering rod 7 whereby either handle when in an operative position, may operate the steering rod 7 to determine the direction of the automobile in a manner well known. A sub-steering rod $7^1$ intervenes between the steering rod 7 and the rear steering handle 4, the main and sub-steering rods being respectively associated with the steering handles 1 and 4 by means of crank arms $7^2$, $7^3$. The rear controller handle 5, when in operative, horizontal, position, is in actuating relation with a sprocket gear wheel 8 which is connected with the driving drum shaft 9 of the controller 10 by means of a sprocket chain 11.

The forward controller handle 2 has an operating connection with the sprocket gear 8, which connection includes crank arms 12, 13 and a link 14 uniting the outer ends of these arms. When the handles 1, 2, 4 and 5 are horizontally disposed they are in operative positions, the handles 4 and 5 at the rear seat being shown, in full lines Fig. 1, in operative positions, at which time the handles 1 and 2 are out of operative positions as indicated by full lines in Fig. 1, the operative positions of the handles 1 and 2 being shown in dot and dash lines in this figure while the inoperative position of handles 4 and 5 are there shown in dot and dash lines. When the handles are not in operative positions they are placed vertically as shown more clearly in Fig. 2, in dot and dash lines in Fig. 4, and in dot and dash lines in Fig. 8. When a steering handle 1 or 4 is not in operative position it is disposed forwardly and longitudinally and its associated controller handle rearwardly and longitudinally of the vehicle, though I do not limit myself to this disposition of the handles, when idle. In order to maintain the handles in the idle positions thereof illustrated in Fig. 1, I provide the hollow columns individual to the handles at each seat each with a recess $a^1$ which receives a ball $a$ when the corresponding handle is in its idle position. These balls are spring pressed, a single spring $b$ at each seat desirably being common to the two balls thereat and operating, through the intermediation of the balls when received in the recesses of the columns, to maintain the associate handles in their idle positions so that the handles will not be passively turned with the handles at the other seat which are in operating position. When a steering handle is to be operatively re-associated with the steering gear it must be given a quarter turn in a clockwise direction in a horizontal plane in order that it may be elevated from its depending position to occupy the operative position which is horizontal and transverse to the direction of travel of the machine. The seat 3 is mounted to swing about its pivot point 15 and occupies the position shown in full lines when the automobile is to be driven exclusively from the rear seat. When either seat is selected from which to drive the machine the hand levers individual to the other seat are turned down and the turned down steering lever is moved a quarter turn to the left to occupy, when thus vertically disposed a position snug to the side of the vehicle body A, such steering handle then being disposed longitudinally of the machine rather than transversely thereof, as indicated in full lines at 1 in Fig. 1 and in dot and dash lines at 4 in Fig. 1. When the steering handle 1 is turned down and forwardly then to be inoperative, the seat 3 is to be turned to occupy the position illustrated in full lines, whereupon the driving is controlled at the rear seat 6. The steering handle 1, having to be turned a quarter turn to the right before it can be elevated to the horizontal and operative position, cannot be turned from the position shown in full lines in Fig. 1 when the seat 3 occupies the position there shown in full lines owing to the obstruction to such movement then effected by this seat whereby the steering of the machine is then limited to the person occupying the rear seat 6. When the machine is controlled at the forward seat, this seat is caused to occupy the position indicated in dot and dash lines in Fig. 1 for this purpose. The steering handle 4 then cannot be turned from the position indicated in dot and dash lines at 4 in Fig. 1 owing to the obstruction to such movement then effected by this seat whereby the steering of the machine is then limited to the person occupying the forward seat 3.

So far as the motor control is concerned the controller handles 2 and 5 are permitted to have such control when they are singly elevated to their horizontal positions generally transverse to the line of travel of the machine and indicated respectively by the dot and dash lines at 2 and full lines at 5 in Fig. 1, these controller handles being deprived of their control when they are dropped to their vertical positions. They need not have interfering relation with the seat 3 since the motor, when an electric motor, preferably has its circuit locked open at the seat 3 or 6 from which control is not to be effected. Thus when the handles at either seat are in their horizontal, operative, positions, the handles at the other seat are depressed out of operative positions.

Referring now more particularly to Figs. 3 and 4, the steering handle 4 is mounted to rotate upon a shaft 16 extending across the branches of the bifurcated upper end of a steering column 17 slotted at one side (Fig. 5) permanently to receive a pilot key 18 (which is employed in the shop as a pilot for assembly) this key being fixed with respect to a sleeve 19 that is longitudinally grooved at its lower end, separably to receive a pilot key 20 (Fig. 6) fixedly carried by a plunger 21 and which pilot key 20 is permanently received in the upper end of a sleeve 22 which is fixed with respect to the crank arm $7^3$. Cap nuts 23 and 24 maintain the assembly of the parts, the spring 25 intervening between the nut 24 and the lower end of the plunger, 21 whereby the top end of this plunger is maintained in engagement with the bottom end of a rod 26 that carries a roller 27 at its upper end that is maintained in engagement with a cam 28 or one of the receiving recesses 29, 30, 31 according to the adjustment of the handle 4. When the handle 4 is depressed or collapsed (it being understood that I do not limit myself to the downward movement of the handle in order to collapse it), the cam 28 will ride upon the roller 27 to depress this roller and thereby the plunger 21 through the intermediation of the rod 26 whereby the key 20 is thrown out of engagement with the slot 32 in the bottom of the sleeve 19 and is wholly confined within the slot 33 in the sleeve 22. When the handle 4 is in the adjustment indicated in Fig. 4 it may be swung in a horizontal plane to turn the crank arm $7^3$, turning movement of the handle being transmitted from the handle through the steering column 17, the key 18, the sleeve 19, the key 20, the sleeve 22, the arm $7^3$, thence ultimately to the vehicle wheels that are to be steered. The plunger 21 has a portion which is co-extensive with the length of the key 20 and which is polygonally shaped in cross section as indicated in Fig. 6 to fit a correspondingly shaped bore of the sleeve 22 so that turning movement from the handle 4 is also transmitted through the plunger 21 to the sleeve 22 when the handle is in its horizontal position. Similarly the steering column 17 has a portion which is co-extensive with the key 18, which column portion is polygonally shaped in cross section to be received within the correspondingly shaped bore of the sleeve 19. The polygonal portions of the steering column and plunger are illustrated respectively in Figs. 5 and 6. The handle is maintained in this horizontal position by the spring 25 operating through the plunger 21 and the rod 26 to maintain the rod 27 in the recess 30. To maintain the roller 27 in the plane of the handle 4, the rod 26 may be provided with a longitudinal groove 34 to receive the inner end of a guide pin 35 which is carried by the steering column 17. As the handle 4 is turned in its horizontal plane the sleeves 19, 22 and the sleeve 36 turn as a unit, the sleeve 36 moving in a bearing 37 that is located in the bore of the ball member 38 of a ball and socket structure, the socket 39 of this structure being fixedly mounted with respect to the vehicle body A and being provided with a cap 40 for clamping the ball 38 in fixed engagement therewith. The ball and socket structure 38, 39 is located at the lower end of the steering column while another ball and socket structure is located at the upper end of the steering column and includes a socket 41 fixedly mounted with respect to the vehicle body, a ball 42 and a clamping nut 43 which clamps the ball and socket fixedly together. In assembling the parts, the nuts 40 and 43 are at first loose in order that the steering column 17 and the separable continuation 36 thereof may be properly self-alined with the aid of a coil spring 40¹ in the bearings therefor which are carried by the balls 42 and 38 whereafter the balls are clamped securedly to their respective sockets. If it should be desired to place the handle 4 out of the way of the operator, while at the same time preserving connection of the steering column portion 36 with the balance of the steering column through the intermediation of the key 20 and the plunger 21, the handle 4 may be raised until the recess 29 receives the roller 27, whereby the handle is maintained in an upright position from which it may be readily restored to its horizontal, operating, position. If it should be desired to throw the handle 4 out of service so as to remove its control from the crank arm 7³, the handle is depressed until it occupies the position shown in dot and dash lines in Fig. 4 and in which position the roller 27 is received by the recess 31, the spring 25 being correspondingly depressed to permit the key 20 and the polygonal portion of the plunger 21 carrying the same to be located sufficiently low to permit any subsequent rotary movement of the steering column 17 not to be communicated to the crank arm 7³ since the steering column 17 has now become separated from its extension 36. When the steering handle is depressed it cannot be turned materially to the rear on account of interference with the associate motor circuit controller handle and the mounting therefor. If it is the handle 4 which is being turned out of service it is turned to occupy the position indicated by dot and dash lines at 4 in Fig. 1, it being assumed that this adjustment of the handle 4 is made to permit control at the forward seat 3. The lever 4 is now pocketed between the back of the seat 3 and the adjacent side of the vehicle body A, the key 20 now being angularly displaced from the slot 32 so that the polygonal portion of the plunger 21 which is co-extensive with the key 20 is maintained out of register with the correspondingly shaped bore in the sleeve 22 whereby the spring 25 is maintained compressed and is ineffective to establish engagement between the parts 21 and 22 until the key 20 is again in register with the slot 32 which occurs when the handle 4 is first turned in a clockwise direction from the position shown in dotted lines in Fig. 1 and when said handle is thereafter elevated to its horizontal, operating, position.

If the control is to be shifted from the forward seat to the rear seat the handle 1 has first to be depressed in order to permit the forward seat 3 to be turned to its rear facing position shown by full lines in Fig. 1, since the handle 1 is so long as to be prevented from being thrown out of and thereafter into operating position owing to the interference of the front of the vehicle body. After the handle 1 has been depressed it is turned in a counter-clockwise direction in order to permit the seat 3 to assume its full rear facing position. I have described in detail but one steering handle 4 and its associate mechanism, it being understood that each steering handle has similar mechanism in association therewith and where like parts appear they are given similar characters of reference.

Each of the controller handles 2 and 5 is associated with mechanism that includes parts which are similar to parts of the mechanism associated with the handles 1 and 4, parts of the mechanism associated with the controller handles 2, 5 which are similar to parts of the mechanism associated with the handles 1, 4 being given similar characters of reference excepting that exponent prime marks are added. In the case of the controller handle 2 or 5 shown in neutral positions respectively by broken and full lines in Fig. 1, motion is communicated therefrom, when this handle is moved in its horizontal plane, by way of the controller column $17^1$, the key $18^1$, the sleeve $19^1$, the key $20^1$, the plunger $21^1$, and the sleeve $36^1$ on which the wheel 8 is fixedly mounted.

When the forward controller handle 2 is to be operated while in its horizontal position motion is communicated from its column continuation $36^1$ to the crank arm 12, the link 14, the crank arm 13 in actuating relation to the portion $36^1$ belonging to the rear controller handle, to the sprocket wheel 8, the rear controller handle then being in a depressed position. The mechanisms are similar excepting that there is but one gear wheel 8 which is fixed upon the sleeve continuation $36^1$ of the rear controller column $17^1$.

While I have herein shown and particularly described the preferred embodiment of my invention it will be understood that changes may readily be made without departing from the spirit thereof and I do not therefore wish to be limited to the precise details of construction shown, but having thus described my invention I claim as new and desire to secure by Letters Patent the following:—

1. A vehicle having a vehicle steering wheel portion; steering mechanism; a handle for operating the steering mechanism; a hollow steering column upon which said handle is swingingly mounted; a rod for bringing said handle into and out of operating relation with the steering mechanism and mounted to move within the column; and a spring for pressing the rod toward the handle.

2. A vehicle having a vehicle steering wheel portion; steering mechanism; a handle for operating the steering mechanism; a hollow steering column upon which said handle is swingingly mounted; a rod for bringing said handle into and out of operating relation with the steering mechanism and mounted to move within the column; and a spring for pressing the rod toward the handle, the handle being provided with recesses adjacent its mounted end which conform to different positions to which the handle may be adjusted and a roller carried at the upper end of said rod and adapted to roll into and out of said recesses to cause the reciprocation of said rod in the steering column.

3. A vehicle having a vehicle steering wheel portion, steering mechanism, a handle for operating the steering mechanism and adjustably mounted to and away from operating positions, and mechanism for establishing operating relation between the handle and steering mechanism and operable by the handle when thrown away from operating position to break the operating relation between the handle and steering mechanism.

4. A vehicle having a vehicle steering wheel portion, steering mechanism, a swingingly mounted handle for operating the steering mechanism, said handle being adapted to swing out of operable position as a steering means and mechanism for establishing operating relation between the handle and the steering mechanism, and operable by the handle when thrown into non-operating position to break the operating relation between the handle and the steering mechanism.

5. A vehicle having a vehicle steering wheel portion, steering mechanism, a swingingly mounted handle for establishing operating relation between the handle and the steering mechanism, said handle being movable out of operating position as a steering means, the steering mechanism including a cam portion operated by the handle in being moved into and out of operating position, and an element operated by the cam portion to establish operating connection between the handle and the steering mechanism in the operating position of the handle and to break such connection in the non-operating position of the handle.

6. A vehicle having a vehicle steering wheel portion; steering mechanism; a handle swingingly mounted for establishing operating relation between the handle and steering mechanism, this mechanism including a cam portion operated by the handle in being moved into and out of operating position and a plunger whose position is governed by the cam portion and serving to establish operating connection between the handle and steering mechanism when the handle is in an operating position and to break such connection when the handle is in a non-operating position.

7. A vehicle having a vehicle steering wheel portion; steering mechanism; a handle swingingly mounted for establishing operating relation between the handle and steering mechanism; this mechanism including a cam portion operated by the handle in being moved into and out of operating position and a plunger provided with a spring for maintaining it in engagement with the cam portion and whose position is governed by the cam portion and serving to establish operating connection between the handle and steering mechanism when the handle is in an operating position and to break such connection when the handle is in a non-operating position.

8. A vehicle having a vehicle steering wheel portion and provided with forward and rear seats from either of which the steering wheel portion is to be controlled; and a steering handle individual to each of said seats, the handle at the rear one of these seats being mounted to permit it to have operating and non-operating positions, the front seat being adjustably mounted to permit it to have forward and rear facing positions and serving when in a rear facing position to obstruct movement of the steering handle individual to said rear seat from a non-operating to an operating position.

9. A vehicle having a vehicle steering wheel portion and provided with forward and rear seats from either of which the steering wheel portion is to be controlled; and a steering handle individual to each of said seats, the handle at the forward seat being mounted to permit it to have operating and non-operating positions, this seat being adjustably mounted to permit it to have forward and rear facing positions and serving when in a rear facing position to obstruct movement of the steering handle from a non-operating to an operating position, the handle at the front seat being adapted to turn, when in non-operating position, to move it out of the way of its associate seat, the front of the vehicle body being sufficiently close to the handle to prevent the handle from occupying a position parallel with the straight line of travel when the handle is horizontal.

10. A vehicle having vehicle controlling mechanism and provided with forward and rear seats from either of which the controlling mechanism is to be controlled; and a controlling handle individual to each of said seats, the handle at the rear one of these seats being mounted to permit it to have operating and non-operating positions, the front seat being adjustably mounted to permit it to have forward and rear facing positions and serving when in a rear facing position to obstruct movement of the steering handle individual to said rear seat from a non-operating to an operating position.

11. A vehicle having vehicle controlling mechanism and provided with forward and rear seats from either of which the controlling mechanism is to be controlled; and a controlling handle individual to each of said seats, the handle at the forward seat being mounted to permit it to have operating and non-operating positions, this seat being adjustably mounted to permit it to have forward and rear facing positions and serving when in a rear facing position to obstruct movement of the controlling handle from a non-operating to an operating position, the handle at the front seat being adapted to turn, when in non-operating position, to move it out of the way of its associate seat, the front of the vehicle body being sufficiently close to the handle to prevent the handle from occupying a position parallel with the straight line of travel when the handle is horizontal.

12. A vehicle having a steering wheel portion and provided with forward and rear seats from either of which the steering wheel portion is to be controlled; steering mechanism; a handle at each seat for operating the steering mechanism and adjustably mounted to have operating and non-operating positions; and mechanism for establishing operating relation between each handle and the steering mechanism and operable by such handle when thrown into a non-operating position to break the operating relation between such handle and the steering mechanism.

13. An automobile having controller mechanism for its motor and provided with forward and rear seats from either of which the controller mechanism is to be controlled; a handle at each seat for operating the controller mechanism and adjustably mounted to have operating and non-operating positions; and mechanism for establishing operating relation between each handle and the controller mechanism and operable at such handle when thrown into a non-operating position to break the operating relation between such handle and controller mechanism.

14. A vehicle having vehicle controlling mechanism and provided with forward and rear seats from either of which the controlling mechanism is to be controlled; a handle at each seat for operating the controlling mechanism and adjustably mounted to have operating and non-operating positions; and mechanism for establishing operating relation between each handle and the controlling mechanism and operable by such handle when thrown into a non-operating position to break the operating relation between such handle and controlling mechanism.

15. A vehicle having a steering wheel portion and provided with forward and rear seats from either of which the steering wheel portion is to be controlled; steering mechanism; a handle at each seat for operating the steering mechanism and adjustably mounted to have operating and non-operating positions; mechanism for establishing operating relation between each handle and the steering mechanism and operable by such handle when thrown into a non-operating position to break the operating relation between such handle and the steering mechanism; and means for preventing a handle from being turned when in idle adjustment at one seat by the operation of the corresponding handle at the other seat.

16. An automobile having controller mechanism for its motor and provided with forward and rear seats from either of which the controller mechanism is to be controlled; a handle at each seat for operating the controller mechanism and adjustably mounted to have operating and non-operating positions; mechanism for establishing operating relation between each handle and the controller mechanism and operable at such handle when thrown into a non-operating position to break the operating relation between such handle and controller mechanism; and means for preventing a handle from being turned when in idle adjustment at one seat by the operation of the corresponding handle at the other seat.

17. A vehicle having vehicle controlling mechanism and provided with forward and rear seats from either of which the controlling mechanism is to be controlled; a handle at each seat for operating the controlling mechanism and adjustably mounted to have operating and non-operating positions; mechanism for establishing operating relation between each handle and the controlling mechanism and operable by such handle when thrown into a non-operating position to break the operating relation between such handle and controlling mechanism; and means for preventing a handle from being turned when in idle adjustment at one seat by the operation of the corresponding handle at the other seat.

18. A vehicle having vehicle controlling mechanism; a handle movable about an upright axis adjacent a seat from which the vehicle is to be controlled and swingingly mounted to occupy a substantially horizontal and operating position and a depressed and non-operating position; and mechanism for establishing operating relation between such handle and the controlling mechanism and operable by such handle when thrown into a non-operating position to break the operating relation between such handle and the controlling mechanism, the handle serving to operate this mechanism to prevent the establishment of such operating relation when the handle, while inoperative, is disposed longitudinally of the vehicle.

19. A vehicle having vehicle steering mechanism; a handle movable about an upright axis adjacent a seat from which the vehicle is to be controlled and swingingly mounted to occupy a substantially horizontal and operating position and a depressed and non-operating position; and mechanism for establishing operating relation between such handle and the steering mechanism and operable by such handle when thrown into a non-operating position to break the operating relation between such handle and the steering mechanism, the handle serving to operate this mechanism to prevent the establishment of such operating relation when the handle, while inoperative, is disposed longitudinally of the vehicle.

In witness whereof I hereunto subscribe my name this twenty-third day of January, A. D. 1914.

ROLAND S. FEND.

Witnesses:
ETTA L. WHITE,
G. L. CRAGG.